E. M. GILES.
SPEEDOMETER.
APPLICATION FILED DEC. 11, 1911.
1,227,420.
Patented May 22, 1917.
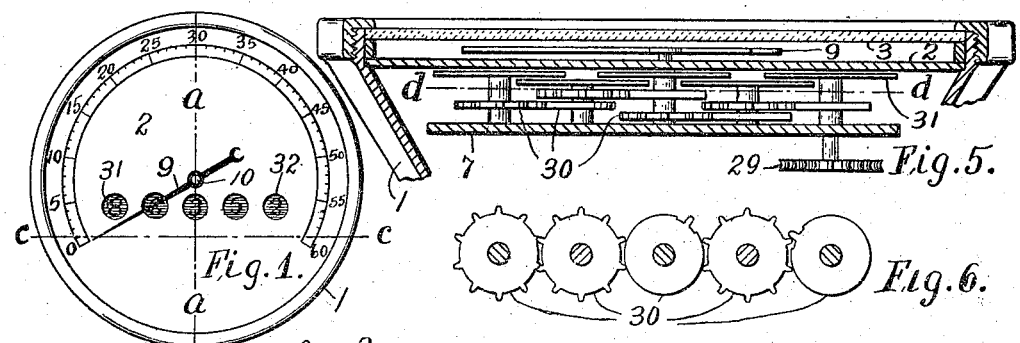
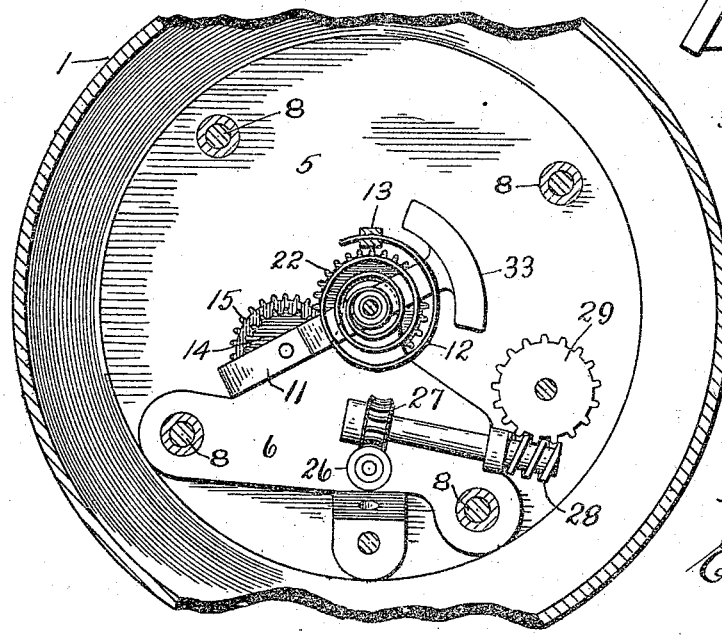

UNITED STATES PATENT OFFICE.

EUGENE M. GILES, OF PEORIA, ILLINOIS.

SPEEDOMETER.

1,227,420.   Specification of Letters Patent.   Patented May 22, 1917.

Application filed December 11, 1911. Serial No. 665,043.

*To all whom it may concern:*

Be it known that I, EUGENE M. GILES, a citizen of the United States, residing at Peoria, in the county of Peoria and State of Illinois, have invented a new and useful Speedometer, of which the following is the specification.

My invention relates to improvements in speedometers, and the object of my invention is to produce a simple, accurate and durable speed indicating mechanism.

In the accompanying drawing which illustrates my invention, Figure 1 is a top or face view of the speedometer; Fig. 2 a side view of the speedometer; Fig. 3 an enlarged sectional view on the line *a—a* of Fig. 1, said view showing the position of the mechanism when the indicating hand points to the number 30 on the dial face; Fig. 4 a view on the line *b—b* of Fig. 3 showing the parts in the normal position when the indicating hand points to 0 on the dial face; Fig. 5 an enlarged section on the line *c—c* of Fig. 1 showing the mileage dials; and Fig. 6 is a top view of the gears which operate the dials.

1 is the case, 2 the graduated face, and 3 the glass, all of which are held together as shown or in any other suitable way. 4, 5, 6, and 7 are frame pieces which are spaced and held together by four posts and sleeves, indicated at 8. 9 is the speed indicating hand which is mounted on the spindle 10, and this spindle is mounted in the frame pieces 6 and 7 so as to turn very freely. Fixed on the spindle 10 is a frame 11 which turns therewith and is held normally in the position with the hand 9 at 0 by means of the spring 12 which is attached at its outer end to a lug 13 on the frame 7 and at its inner end to the spindle 10. This frame 11 carries at its outer end integral gears 14 and 15 which are pivoted in the frame to turn very freely, and the entire frame and gears are perfectly balanced by means of the weight 33 on the frame 11.

16 is a stub shaft which is squared at one end or otherwise constructed so as to receive the end of the flexible speedometer shaft 34 and this shaft 16 has a bevel gear 17 which meshes with the bevel gear 18, and communicates power through the gears 19, 20, 21, which are mounted in the frame pieces 5 and 6 and the gear 22 which is mounted on a stub of the frame 6 concentric with the spindle 10, to the gear 14.

Concentric with the gear 22 is a spindle 23 which carries a fan 24 and has the gear 25 thereon in mesh with the gear 15 so as to be driven thereby.

As is apparent the fan 24 provides a resistance which varies with its speed and in operation the frame 11 and gears 14 and 15 turn against the tension of the spring 12 until the tension of the spring equals the resistance of the fan. The faster the fan is driven the farther the frame 11 and hand 9 are turned and the speed is thereby indicated.

The mileage is recorded through the worm and worm wheel 26 and 27 respectively and the worm and worm wheel 28 and 29 respectively to the usual dial operating gears 30 which have dials 31 thereon whose figures are visible through the openings 32 in the face plate 2.

Having thus fully described my invention, what I claim and desire to secure by Letters Patent of the United States is:

1. In a device of the class described, the combination of an oscillating structure, an indicating means operated by the oscillating structure, means for yieldingly holding the oscillating structure at one extremity of its oscillation, a rotary drive member concentric with the oscillating structure, means for supporting the said rotary drive member independently of the oscillating structure, a rotary driven member pivoted eccentrically on the oscillating structure, and a resistance element operated by the driven member.

2. In a device of the class described, the combination of a frame, an oscillating member pivoted in said frame, a stationary part on the frame projecting axially of the oscillating member, driven means on the oscillating member positioned to swing around said projecting stationary part on the frame, a driving member on the said projecting stationary part coöperating with the said driven means on the oscillating part for oscillating the oscillating member, an indicating means operated by the oscillating member, and means for yieldingly holding the oscillating member at one extremity of its oscillation.

3. In a device of the class described, the combination of an oscillating part, a supporting frame provided with a stationary hub extending axially of the oscillating part, means for operating the oscillating part comprising a driven member mounted on the oscillating part at a distance from the axis, a drive member mounted on the said stationary hub for operating the driven member on the oscillating part, and escapement means for providing a slippage in the transmission of power to the oscillating part for regulating the amount of oscillation, means for yieldingly holding the oscillating part at one extremity of its oscillation, and indicating means movable with the oscillating part.

4. In a device of the class described, the combination of an oscillating part, a stationary hub extending axially of the oscillating part, means for operating the oscillating part comprising a driven member depending from the oscillating part at a distance from the axis so as to swing about said stationary hub, a drive member mounted on said stationary hub and extending laterally from the said stationary hub so as to coöperate with the said depending driven member on the oscillating part, an air compartment provided with escapement means for providing a slippage in the transmission of power to the oscillating part for regulating the amount of oscillation, means for yieldingly holding the oscillating part at one extremity of its oscillation, and indicating means movable with the oscillating part.

5. In a device of the class described, the combination of operating mechanism driven at a speed proportional to the speed to be indicated, an oscillating part, indicating means operated by the oscillating part, a casing for supporting the operating mechanism and oscillating part, said casing being provided with a separate air chamber and a compartment containing the operating mechanism, said air chamber being provided with means for providing a slippage in the transmission of power from the operating mechanism to the oscillating part so as to cause oscillation of the oscillating part which varies in proportion to the speed of the operating mechanism.

6. In a speed responsive device, a frame structure, an indicator shaft journaled thereon, an oscillatory frame fixed to and extending on opposite sides of the shaft, one end of said oscillatory frame being weighted and the opposite end formed to provide opposing portions, a pair of connected gears journaled in said opposing frame portions, a gear freely rotatable on the frame structure and meshing with one of said connected gears, a resistance element journaled in the frame structure, a gear fixed to the resistance element in superposed relation with the third gear and meshing with the other of said connected gears, and means for driving the third gear.

7. In a speed responsive device, a frame having a bearing plate, an indicator shaft journaled in one side of the plate, an oscillatory frame fixed to the shaft, resilient means holding the frame in one position, a pair of connected gears journaled on the oscillatory frame at a distance from the shaft, a gear journaled on the opposite side of the bearing plate in meshing relation with one of the connected gears, means for driving the third gear, a resistance element journaled in said last side of the bearing plate, and a gear fixed to the resistance element in meshing relation with the other connected gear.

In witness whereof I have hereunto affixed my signature in the presence of two subscribing witnesses.

EUGENE M. GILES.

Witnesses:
NATHAN H. WEISS,
JOS. F. BARTLEY.

Copies of this patent may be obtained for five cents each, by addressing the "Commissioner of Patents, Washington, D. C."